No. 773,695. PATENTED NOV. 1, 1904.
H. D. WALKER.
SEAT FOR AGRICULTURAL MACHINES.
APPLICATION FILED NOV. 16, 1903.
NO MODEL.
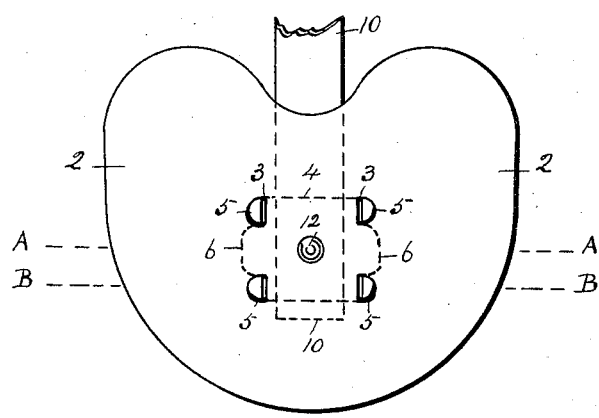
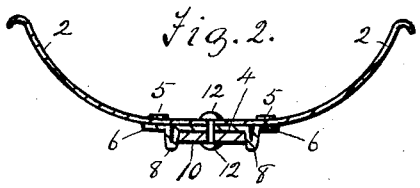
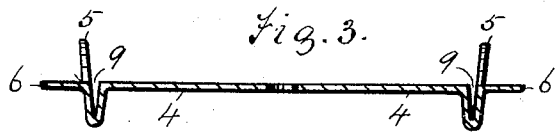
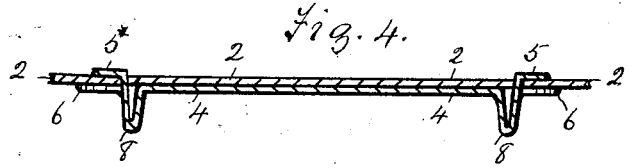
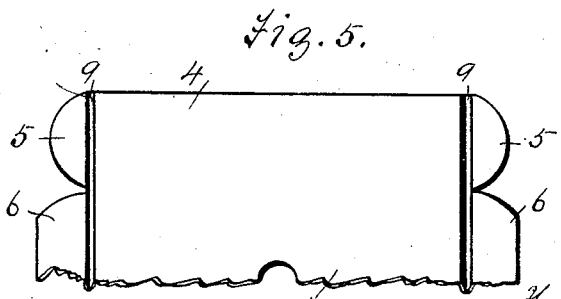
Witnesses.
H. Y. Drope
A. McPherson
Inventor.
Hugh D. Walker,
By John K. Hendry, Atty.

No. 773,695. Patented November 1, 1904.

UNITED STATES PATENT OFFICE.

HUGH D. WALKER, OF PRESTON, CANADA.

SEAT FOR AGRICULTURAL MACHINES.

SPECIFICATION forming part of Letters Patent No. 773,695, dated November 1, 1904.

Application filed November 16, 1903. Serial No. 181,313. (No model.)

*To all whom it may concern:*

Be it known that I, HUGH D. WALKER, a citizen of Canada, residing at Preston, in the county of Waterloo and Province of Ontario, Canada, have invented new and useful Improvements in Seats for Agricultural Machines, of which the following is a specification.

My invention relates to improvements in seats for agricultural machines, in which a sheet-metal retaining-plate with side tongues or jaws for the spring supporting-bar is secured to the under side of a sheet-metal seat.

The objects of my invention are, first, to provide a sheet-metal plate adapted in itself to secure to the under side of a seat; second, to provide a sheet-metal plate with side tongues and adapted to fasten in itself to the under side of a seat to receive the spring supporting-bar between said tongues and to secure the seat to the bar with one bolt or rivet only. I attain these objects by the mechanism illustrated in the accompanying drawings, in which—

Figure 1 is a plan of an agricultural-machine sheet-metal seat, showing in broken lines the sheet-metal plate on the under side of the seat and the bent lips of said plate on the seat. Fig. 2 is a sectional elevation of the seat, showing the bar-retaining plate in position. Fig. 3 is an enlarged sectional elevation of the plate through the horizontal line A A previous to its attachment to the seat. Fig. 4 is an enlarged sectional elevation of the plate through the horizontal line B B, the securing-lips being bent outwardly to fastening position. Fig. 5 is an enlarged plan of one-half of the plate with the lips bent to securing position.

Similar numerals refer to similar parts throughout the several views.

In the drawings the agricultural-machine seat is indicated by 2 and is made of stamped sheet metal and has four openings or slots 3. The sheet-metal plate 4 is preferably made of steel and stamped to shape. The four lips 5 of the plate 4 are a part of the plate, together with the parallel side flanges 6. When the plate 4 is made or stamped, the lips 5 point in an upward direction, as shown in Fig. 3 of the drawings, and when the plate 4 is being attached to the under side of the seat 2 the lips 5 are inserted through the slots 3 of the seat and then bent outwardly and downwardly to the face of the seat. The side flanges 6 fit against the under side of the seat. The lips 5 and the side flanges 6 hold the plate or body part 4 very firmly to the seat.

The parallel side tongues 8 are formed with the plate 4 and are a part of the same and add very materially to the strength thereof. The side tongues 8 are formed of two thicknesses of metal and extend the whole length of the plate. The grooves 9, which are formed between the walls of each tongue 8, also extend the length of the plate and are formed in the stamping or making of the same. Between the side tongues 8 is the spring supporting-bar 10. (Shown in Figs. 1 and 2 of the drawings.) Said bar 10 is held in position by the bolt or rivet 12, which passes through a central part of the seat 2, the central part of the plate 4, and the bar 10 and holds the bar to the plate, consequently the seat.

When the supporting-bar 10 is in position between the tongues or jaws 8 of the plate 4, said plate, and consequently the seat 2, is very firm and solid in fixture with said bar, one bolt or rivet through a central part of the seat, plate, and bar being sufficient to hold the same together and very firmly. The tongues 8 are very strong and adapted for the purpose intended—namely, to hold the seat firm on the bar, to prevent any side movement of the seat, and to strengthen very materially the flanges 6 and the flanges 6 reacting on and giving strength to the tongues 8. It will be observed that when the plate 4 is in position on the under side of the seat 2 the face of the four lips 5 and the face of the flanges 6 hug very closely and firmly the metal of the seat, and the endurance and stability of the whole is very satisfactory.

It will be noticed that the side lips 5, the side flanges 6, and the side tongues 8, together with the body part of the plate 4, are one single piece of metal.

What I claim as my invention, and desire to secure by Letters Patent, is—

1. In a seat for agricultural machines, a sheet-metal seat, slots in the seat, a sheet-metal retaining-plate, lips on the plate to fasten through said slots, side flanges on the plate between said lips and on the under side of the seat, tongues of two thicknesses of metal on the under side of the plate and a supporting-bar between the tongues, substantially as set forth.

2. In a seat for agricultural machines, a bar-retaining plate, side lips on the plate, side flanges below and between the lips, and tongues comprising two thicknesses of metal on the lower part of the plate, all of one single piece of metal, substantially as set forth.

3. In a seat for agricultural machines, a seat and bar-retaining plate of one single piece of metal and comprising a body-plate, side lips, side flanges between and below the lips, and tongues of two thicknesses of metal below said body and extending the length of the body-plate, substantially as set forth.

HUGH D. WALKER.

Witnesses:
W. F. MICKUS,
J. RYERSON.